United States Patent
Qualizza et al.

(10) Patent No.: US 10,248,922 B1
(45) Date of Patent: Apr. 2, 2019

(54) MANAGING NETWORK PATHS WITHIN A NETWORK OF INVENTORY SPACES

(71) Applicant: Amazon Technologies, Inc., Seattle, WA (US)

(72) Inventors: Andrea Qualizza, Phoenix, AZ (US); Matt Watson, Seattle, WA (US); Hehe Zhou, Sammamish, WA (US); Burak Karacik, Seattle, WA (US); Qizhang Dai, Seattle, WA (US); Cary Jordan Rotman, Seattle, WA (US); Priya Sekar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 15/068,094

(22) Filed: Mar. 11, 2016

(51) Int. Cl.
*G06Q 10/00* (2012.01)
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,778,345 A | * | 7/1998 | McCartney | G06Q 10/06 705/2 |
| 5,940,816 A | * | 8/1999 | Fuhrer | G06Q 10/06 706/13 |
| 5,953,707 A | * | 9/1999 | Huang | G06Q 10/06 705/7.25 |
| 6,954,736 B2 | * | 10/2005 | Menninger | G06Q 10/06 705/27.1 |
| 7,295,990 B1 | * | 11/2007 | Braumoeller | G06Q 10/063 705/28 |

(Continued)

OTHER PUBLICATIONS

Brandimarte, Paolo. "Multi-item capacitated lot-sizing with demand uncertainty." International Journal of Production Research 44.15 (2006): 2997-3022. (Year: 2006).*

(Continued)

*Primary Examiner* — Alan S Miller
(74) *Attorney, Agent, or Firm* — Kilpatrick Townsend & Stockton LLP

(57) ABSTRACT

Techniques for managing network paths within a network of inventory spaces are described. The inventory spaces may store items. The network paths may connect the inventory spaces such that network vehicles may transport the items between the inventory spaces. Based on consumer demand for the items, unconstrained fulfillment options may be generated to fulfill the consumer demand from the network. A subset of the fulfillment options may be selected based on a performance of the network. The performance may be associated with utilizing the subset of the fulfillment options to fulfill the consumer demand. The performance may be evaluated based on constraints associated with the network and variables associated with utilizing the network paths. Data about the subset of the fulfillment options may be provided to a deployment system configured to deploy the network vehicles according to the schedules.

20 Claims, 10 Drawing Sheets

(56) References Cited

U.S. PATENT DOCUMENTS

| | | | | | |
|---|---|---|---|---|---|
| 8,000,988 | B1* | 8/2011 | Bezanson | ............ | G06Q 10/063 705/7.11 |
| 8,280,757 | B2* | 10/2012 | Liao | ................ | G06Q 30/0202 705/7.29 |
| 8,386,397 | B1* | 2/2013 | Agarwal | .............. | G06Q 10/083 705/330 |
| 8,504,485 | B1* | 8/2013 | Wenneman | .......... | G06Q 10/083 705/338 |
| 8,527,373 | B1* | 9/2013 | Ricci | .................... | G06Q 10/087 705/22 |
| 8,930,142 | B2* | 1/2015 | Yoshizumi | ......... | G01C 21/3492 701/533 |
| 9,174,758 | B1* | 11/2015 | Rowley | ................... | B65B 59/00 |
| 9,336,509 | B1* | 5/2016 | Arun Singhal | ...... | G06Q 10/087 |
| 9,754,232 | B2* | 9/2017 | Kamath | ............. | G06Q 10/0633 |
| 2003/0093388 | A1* | 5/2003 | Albright | ................ | G06Q 10/08 705/400 |
| 2006/0178927 | A1* | 8/2006 | Liao | ........................ | G06Q 10/04 705/7.31 |
| 2008/0228325 | A1* | 9/2008 | Schindler | ............... | G06Q 10/04 700/291 |
| 2010/0030743 | A1* | 2/2010 | Lim | ....................... | G06Q 10/10 707/758 |
| 2010/0125486 | A1* | 5/2010 | Sinclair | .................. | G06Q 10/08 705/7.31 |
| 2010/0125487 | A1* | 5/2010 | Sinclair | .................. | G06Q 10/06 705/7.31 |
| 2013/0311227 | A1* | 11/2013 | Santos | ................... | G06Q 10/00 705/7.23 |
| 2017/0323250 | A1* | 11/2017 | Lindbo | ................ | G06Q 10/087 |

OTHER PUBLICATIONS

Qualizza A., Belotti P., Margot F. (2012) Linear Programming Relaxations of Quadratically Constrained Quadratic Programs. In: Lee J., Leyffer S. (eds) Mixed Integer Nonlinear Programming. The IMA Volumes in Mathematics and its Applications, vol. 154. Springer, New York, NY (Year: 2012).*

Hu, Zhi-Hua, and Xiao-Kun Yu. "Optimization of fast-fashion apparel transshipment among retailers." Textile Research Journal 84.20 (2014): 2127-2139. (Year: 2014).*

Hochmuth, Christian A., and Peter Köchel. "How to order and transship in multi-location inventory systems: The simulation optimization approach." International Journal of Production Economics 140.2 (2012): 646-654. (Year: 2012).*

Sarraj, Rochdi, et al. "Interconnected logistic networks and protocols: simulation-based efficiency assessment." International Journal of Production Research 52.11 (2014): 3185-3208. (Year: 2014).*

Maravelias, Christos T. "Mixed integer programming methods for supply chain optimization." PASI 2011 (Year: 2011).*

* cited by examiner

MANAGING NETWORK PATHS WITHIN A NETWORK OF INVENTORY SPACES

BACKGROUND

A service provider may operate an electronic platform to provide different services to users. Front end systems and back end systems of the electronic platform may facilitate different functionalities of the electronic platform. The functionalities may span both the digital world and the physical world. A web site is an example of a front end system. The web site may support a user access to the electronic platform to, for example, place orders for items. An inventory management system and a vehicle management system are examples of back end systems. The inventory management system may manage the inventorying of the items in different inventory spaces of the electronic platform. In comparison, the vehicle management system may manage deployment of vehicles to transport items between the inventory spaces.

Proper operations of the electronic platform may depend on a synergetic use of the front and back end systems. For example, on one hand, orders expected at the web site over a next planning horizon may be estimated from historical orders received at the web site. On the other hand, a vehicle may be deployed to transport items between two inventory spaces according to a plan. The synergetic use may involve updating the plan for the next planning horizon based on the expected orders. The plan may depend on the type, volume, and destinations of such orders. Thus, the vehicle management system may controllably deploy and use the vehicle in part according to the expected orders at the web site. As the number of inventory spaces, items, vehicles and vehicle types, and orders increases, optimizing the vehicle deployment and usage in real-time (e.g., in time to support the next planning horizon) may become computationally infeasible. This may result in a sub-optimization in the physical world. In other words, absent a system (e.g., front end, back end, or intermediary system) that may properly and efficiently process digital data (e.g., order data) for the synergetic use, vehicle deployment and usage in the physical world may be sub-optimal.

BRIEF DESCRIPTION OF THE DRAWINGS

Various embodiments in accordance with the present disclosure will be described with reference to the drawings, in which.

DETAILED DESCRIPTION

Figure 1:
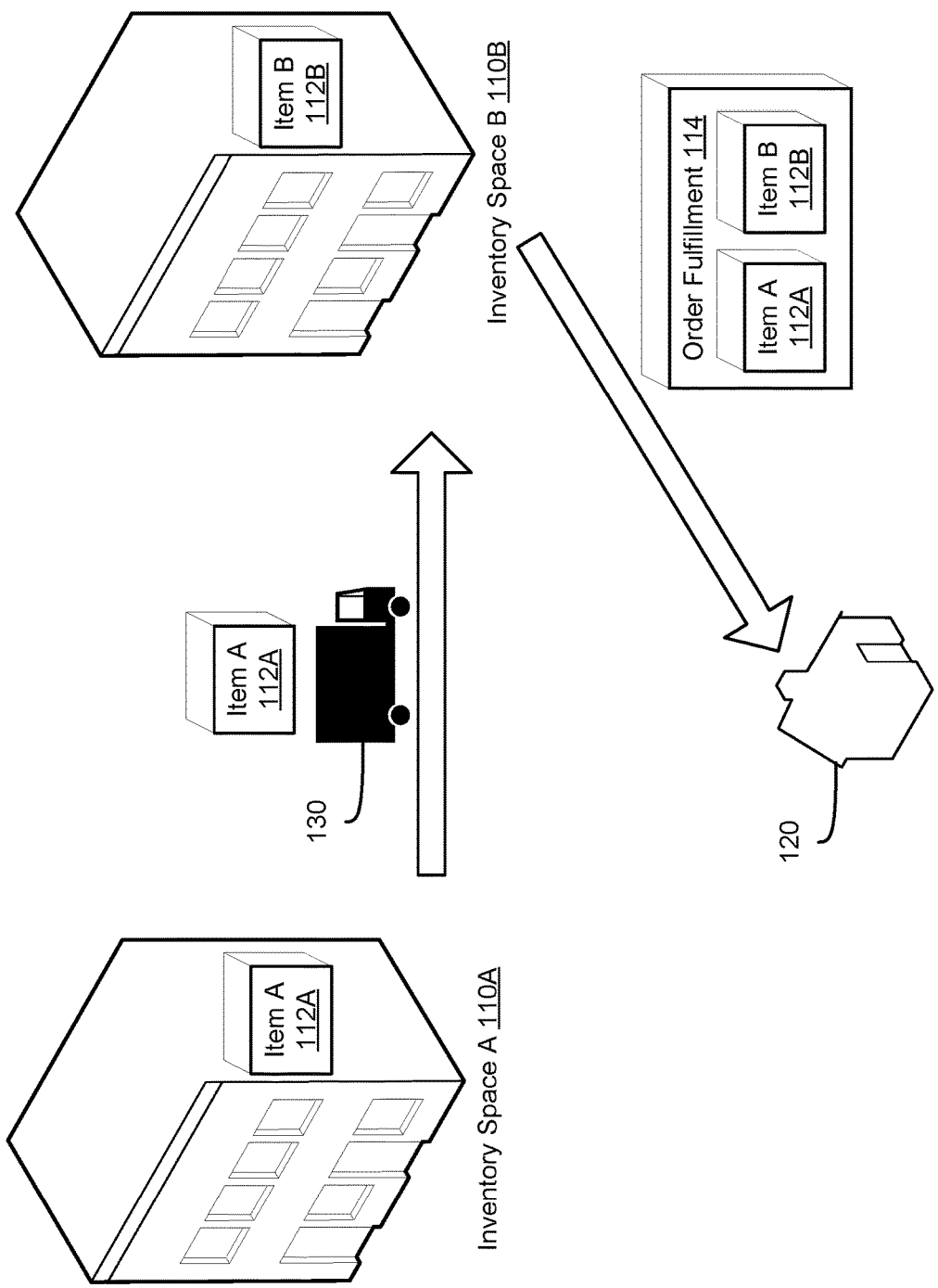
FIG. 1 is a block diagram illustrating an example environment for deploying a vehicle, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing network paths within a network. A network path may represent a unidirectional or bidirectional lane or route between two inventory spaces. A vehicle may transport an item between the two inventory spaces over the network path. Transporting an item between two inventory spaces over a network path may be referred to herein as "transship." More specifically, a model may be implemented to optimize the transships. The optimization may involve selecting the optimal network paths in addition to the optimal types of vehicles and the optimal schedules of the vehicles. The model may perform a global optimization by considering all network paths, all vehicle types, and all schedules in an unconstrained manner and by finding the optimal solution given a set of input parameters and constraints. In other words, the model may consider a continuum of transships to derive the optimal subset of transships. In an example, the model may be integrated or interface with a vehicle management system of an electronic platform. Some functionalities of the electronic platform may be supported by the inventory spaces. For instance, the electronic platform may be configured to offer items stored in the inventory spaces. The input and constraints to the model may be representative or associated with orders for items. By outputting the optimal transships, the vehicle management system may generate a plan to deploy and use particular vehicles to transport the items within the network of inventory spaces. The plan may specify the vehicle deployment and usage according to the optimal network paths, optimal vehicle types, and optimal vehicle schedules. Thus, in this example, the model may efficiently process digital data (e.g., order data) for a synergetic use with a back end system to optimize the vehicle deployment and usage in the physical world. In other words, the model may affect and improve the vehicle deployment and usage in the physical world.

A system that embodies such a model may provide various improvements over existing systems. For example, in the context of the above electronic platform, the system may generate the plan for a next planning horizon (e.g., a week). The amount of input parameters and constraints may be large (e.g., millions of input data points and millions of constraint data points). Absent the embodied techniques, finding the optimal solution in real-time may be computationally infeasible. As used herein, "real-time" may refer to the capability of finding a solution to timely support an execution of a plan that uses the solution. For instance, finding the optimal solution in real-time may represent finding the optimal solution before an actual start of the next planning horizon such that the optimal plan may properly be used during the planning horizon. In another example, many systems may subscribe to the output of the model. Operations of these systems may be improved. For instance, the vehicle management system may plan the vehicle deployment and usage in an optimized manner. Similarly, an inventory management system may plan for receiving and storing transshipped items in an optimized manner. In yet a further example, the synergetic use of the digital data to manage operations in the physical world may improve such operations. For instance, the physical deployment and usage of a vehicle may be optimized. This may become crucial in various situations. For instance, there may be a situation where some or all of the deployed vehicles may be unmanned vehicles. Such vehicles may autonomously perform certain operations associated with transporting items. In these situations, an optimal plan may become paramount to properly manage the physical deployment and usage of the unmanned vehicles.

To illustrate, consider an example of offering items to consumers via an electronic platform. A planning horizon for one week may be set. To generate a vehicle deployment and usage plan for next week, a vehicle management system of the electronic platform may access historical item orders received last week at a web site of the electronic platform. Out of these orders, the vehicle management system may generate unconstrained fulfillment options.

A fulfillment option may represent a particular way of fulfilling an order from one or more inventory spaces. If the fulfillment option includes a transship, the fulfillment option may accordingly specify a network path, a vehicle type, and a vehicle schedule for the transship. For instance, an order for two items may be fulfilled using one of many possible fulfillment options when the two items are located at different inventory spaces. One fulfillment option may include delivering the first item from the first inventory space and the second item from the second inventory space to a consumer destination. Another fulfillment option may include transshipping the first item to the second inventory space according to a particular vehicle type and vehicle schedule and delivering the two items from the second inventory space to the consumer destination. Yet another fulfillment option may include a similar transship that uses a different vehicle type and/or vehicle schedule. Yet another fulfillment option may include the opposite transship: transshipping the second item to the first inventory space and delivering both items from the first inventory space to the consumer destination.

Each of the fulfillment options may be associated with a cost (e.g., transship cost that may include vehicle specific and schedule specific costs, among other costs). The vehicle management system may search for the subset of fulfillment options that may optimize (e.g., minimize) the cost for fulfilling the historical orders while also meeting particular constraints (e.g., order constraints, vehicle constraints, time constraints, labor constraints, and other transship or delivery-related constraints). The fulfillment option subset may represent the optimal subset to fulfill the historical orders given the constraints. The vehicle management system may extract the network paths, vehicle types, and vehicle schedules from this optimal subset and accordingly generate a vehicle deployment and usage plan.

In an example, generating the vehicle deployment and usage plan may involve an interaction between the vehicle management system and a production system of the electronic platform. The production system may maintain and manage actual production data and production plan (e.g., production vehicle deployment and usage) to fulfill the orders for the next week time period. In this example, the vehicle management system may receive production data about the orders and production plan. The vehicle management system may simulate a performance of the network of inventory spaces given the production data and production plan. This performance may be referred to as a baseline performance. Simulating the performance may include, for instance, simulating a total cost incurred for transshipping items within the network. Similarly, the vehicle management system may simulate a performance of the network given the production data and given the optimal plan instead of the production plan. The vehicle management system may compare this performance to the baseline performance. If an improvement is detected (e.g., the cost is reduced), the vehicle management system may output the optimal plan as a recommendation to the production system. In turn, the production system may revise the production plan accordingly.

These and other features are provided for illustrative purposes. In the interest of clarity of explanation, the embodiments are described herein within the context of optimizing (e.g., reducing) an overall cost associated with a network of inventory spaces. This cost may include a transship cost (e.g., the cost to transship items) and/or an outbound cost (e.g., the cost to deliver the items from the inventory spaces to consumer destinations) and may represent a performance of a network of inventory spaces. However, the embodiments are not limited as such. Instead, other types of network performance may be similarly optimized. Such performances may include delivery time, delivery distance, the delivery method, the number of transship vehicles, the type of transship vehicles, throughput of items and/or orders (e.g., total quantities or total values) processed (e.g., received, stored, packaged, and/or sent) per inventory space within a time period, and/or other optimization parameters.

Turning to FIG. 1, the figure illustrates an example environment for deploying a vehicle to transship an item. The figure provides a simplified illustration about how transship may optimize order fulfillments. However, the embodiments described herein are not limited as such. Typically, a much larger number of items, consumers, and/or inventory spaces may exist.

As illustrated, an inventory space 110A may store an item 112A, while another inventory space 110B may store another item 112B. The items may be available for ordering from the inventory spaces through a web site of an electronic platform. A user may operate a computing device to access the web site, order the items, and specify a delivery destination 120. A production system of the electronic platform may initiate a delivery of the items to the delivery destination 120.

Different fulfillment options to fulfill the order may be possible. For example, the item 112A may be delivered from the inventory space 110A, while the item 112B may be delivered from the inventory space 110B. Other fulfillment options may include transshipping one of the items to the other inventory space and delivering both items from that inventory space. Within these transship fulfillment options, there may be a number of options. These options may vary depending on the vehicle type (e.g., a small truck, a large truck, an aerial vehicle, or other vehicle types affecting the transship method) and the vehicle schedule (e.g., early day, mid-day, or late day transship).

A vehicle management system of the electronic platform may consider these different fulfillment options and search for the optimal one (e.g., the one that minimizes an overall cost to send the two items to the delivery destination 120). Different optimization techniques may be possible. One example technique may include a local optimization. In this technique, the delivery management system may only consider input parameters and constraints specific to the order and the item. However, such a technique may result in a sub-optimization. An illustration of this sub-optimization is described below. Another example technique may include a global optimization. In this technique, the delivery management system may perform an optimization across a much larger number of items and orders such that the selected fulfillment option for the two items may be a piece of a much larger optimization puzzle.

For instance, under the local optimization technique, the delivery management system may determine that no transship may be necessary. That may be because delivering the item 112A from the inventory space 110A and the item 112B from the inventory space 110B may be the cheapest among other fulfillment options specific to fulfilling the order of the consumer. In the interest of clarity of explanation, assume that this order's specific cost is $10. The local optimization may be repeated across various orders. In the interest of clarity of explanation, assume that the total cost to fulfill all of these orders (e.g., the sum of the individual order specific costs) is $150. In comparison, under the global optimization technique, the delivery management system may determine that a transship of the item 112A using a delivery vehicle 130 according to a particular schedule may result in the cheapest overall cost to fulfill many other orders. This determination may be possible because the global optimization may consider all of the fulfillment options for all orders. In the interest of clarity, assume that this overall cost is $100. Within that cost, assume that transshipping the item 112A and delivering the two items from the inventory space 110B may have a cost of $11. Although the cost of $11 of the global optimization is higher than the cost of $10 of the local optimization, the overall cost to fulfill many orders in addition to this particular order is minimized (e.g., to a cost of $100) under the global optimization.

Hence, from an optimization standpoint, the global optimization may result in more optimal results than the local optimization.

Once the optimization (e.g., the global optimization) is performed, the vehicle management system may generate a vehicle deployment and usage plan. For instance, the plan may include using the delivery vehicle 130 to transship the item 112A to the inventory space 110B, along with other items. The vehicle management system may output this plan as a recommendation to the production system. In turn, the production system may plan for fulfilling the order based on the transship. As such, once the item 112A is received at the inventory space 110B, the item 112A and the item 112B may be added to the same container, thereby creating an order fulfillment 114. That container may then be delivered to the consumer destination 120.

Figure 2:
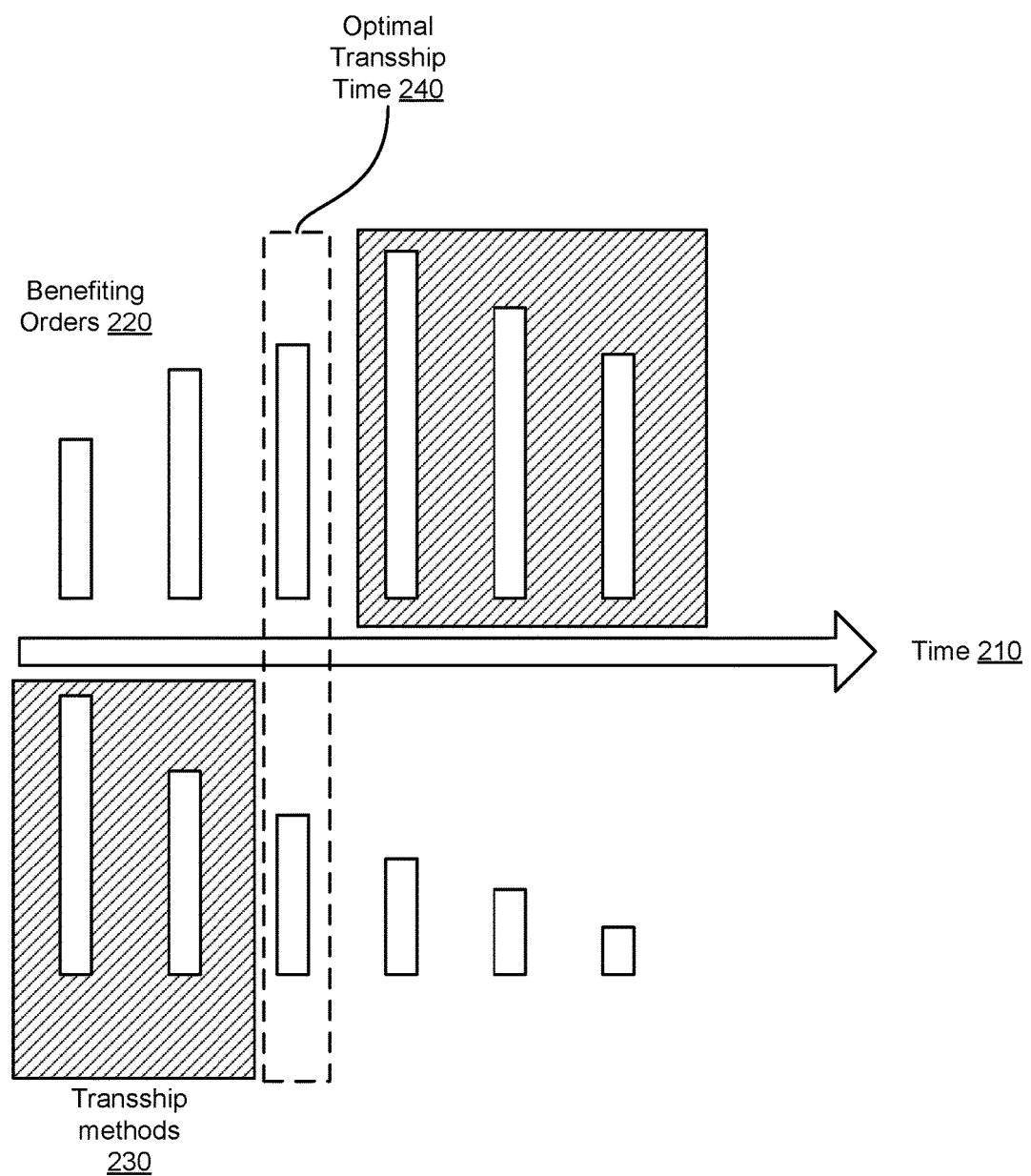
FIG. 2 is a block diagram illustrating an example comparison between parameters affecting vehicle deployment, according to embodiments.

The global optimization may involve analyzing different fulfillment options across different items and orders. For a same transship (e.g., transshipping the item 112A to the inventory space 110B), there may be a number of fulfillment options. These options may vary based on the vehicle type and vehicle schedule. For instance, one fulfillment option may involve transshipping the item 112A using a small ground vehicle in the early morning. Another fulfillment option may involve transshipping the item 112A using a large ground vehicle in mid-day. Yet another fulfillment option may involve transshipping the item 112A using an aerial vehicle late in the day. Hence, the global optimization may consider such variability. FIG. 2 illustrates an example of balancing between vehicle type and vehicle schedule.

Figure 3:
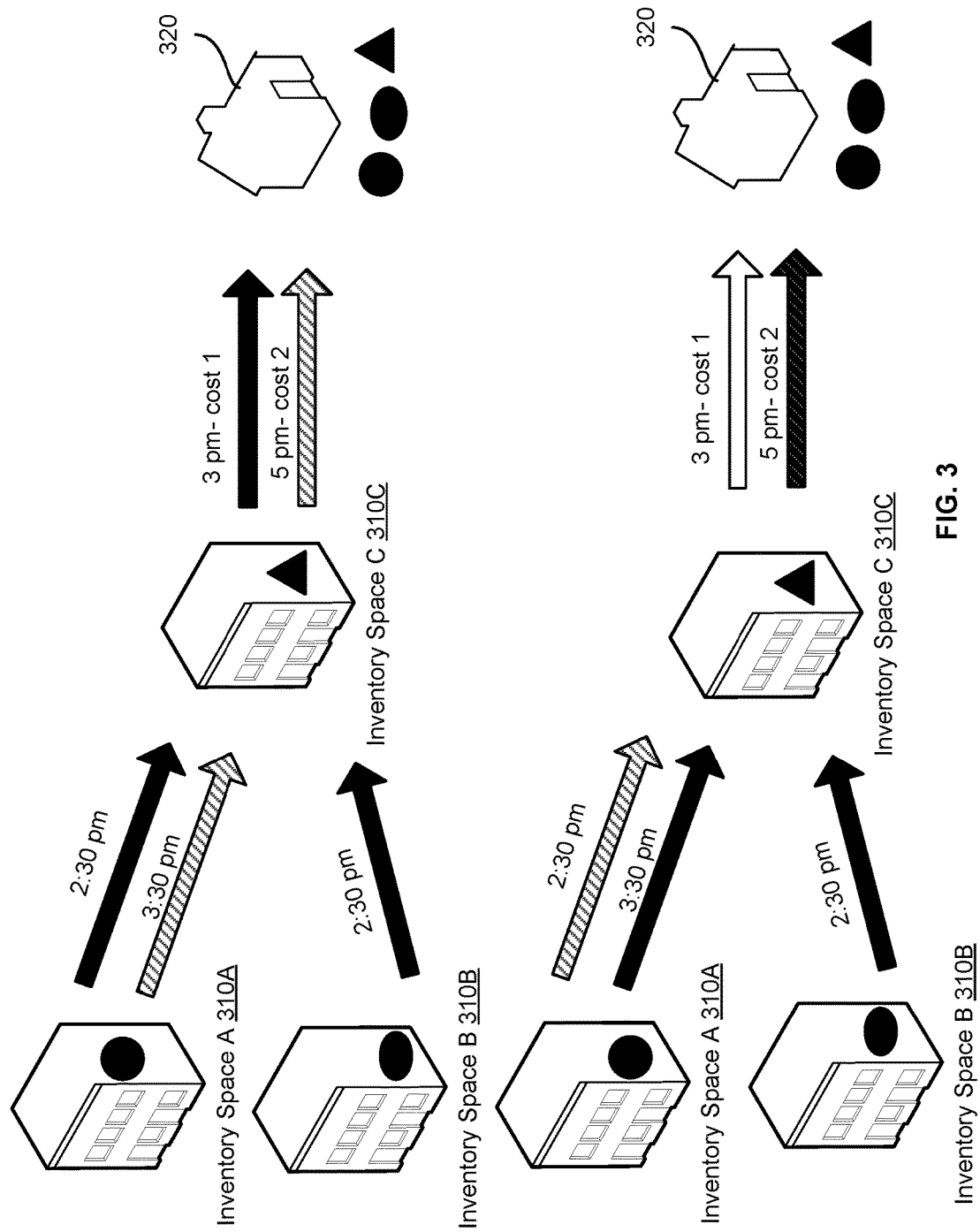
FIG. 3 illustrates an example comparison between the effects of vehicle deployment, according to embodiments.

In addition, the global optimization may initially consider unconstrained fulfillment options. An unconstrained fulfillment option may represent a fulfillment option not constrained by any parameters. However, in certain situations, a constraint may be necessary. For instance, if a fulfillment option results in a delivery of an item past a promised delivery date, that fulfillment option should be removed from the analysis. FIG. 3 illustrates an example constraint imposed to capture the effect of multiple transships between inventory spaces.

FIG. 2 illustrates an example set of parameters that may be used for optimizing a vehicle deployment and usage plan. The time 210 is illustrated on the horizontal axis. The number of orders that may benefit from transships are illustrated on the top vertical axis (shown as benefiting orders 220). Additionally, the number of available methods for transships are illustrated on the bottom vertical axis (shown as transship methods 230). A transship method may represent a particular vehicle type for a transship. For instance, using a small ground truck may correspond to a transship method. The benefiting orders 220 may be used as one of the parameters in the optimization. Similarly, the transship methods 230 may be used as another parameter in the optimization. In addition, both parameters may be used in conjunction. These uses are described herein next.

Considering the benefiting orders 220, earlier transship times (e.g., transship vehicles scheduled for earlier transships) may result in a lower number of benefiting orders 220. That may be because the time to pick some orders may not be sufficient or may not support the transship of these orders. Conversely, the later the transship time, the larger the number of benefiting orders 220 may be. However, that number may drop off near an end of the day for various reasons (e.g., fewer transship vehicles because of a smaller vehicle fleet or a smaller workforce during late shifts). Hence, one type of balancing may include finding the proper time between the early and late transships that may optimize (e.g., maximize) the number of benefiting orders 220.

Now, considering the transship methods 230, earlier transship times (e.g., transship vehicles scheduled for earlier transships) may be supported by a larger number of transship methods 230. That may be because of a larger number of transship vehicles, workforce, or options for the transships since more time exists during the day. Conversely, the later the transship time, the smaller the number of transship methods 230 may be. Hence, one type of balancing may include finding the proper time between the early and late transships that may optimize (e.g., maximize) the number of transship methods (and, conversely, the number of used transship vehicles).

When considering these two parameters in conjunction, an optimal transship time 240 may be found. That time may correspond to the time that increases the number of benefiting orders 220 while also ensuring that a sufficient number of transship methods 230 may support the on-time transship of the benefiting orders 220. Hence, using the two parameters in conjunction may represent an optimization that may search for the optimal transship time 240.

The parameters of FIG. 2 are described for illustrative purposes. A larger and/or different set of parameters may also be used. Such parameters are further described in the next figures.

FIG. 3 illustrates another example parameter for optimizing a vehicle deployment and usage plan. The illustrated parameter may be referred to as a network effect and may become more relevant when the network of inventory spaces includes a larger number of inventory spaces. When an order contains, for instance, three (or more) items distributed among three (or more) respective inventory spaces with delivery of the three items to a consumer destination 320 is a single fulfillment order (e.g., in one container), the network effect may be considered. The network effect may represent the effect of one network path between two inventory spaces over other network paths and/or the overall network.

As illustrated in FIG. 3, a consumer may have ordered three items (shown with circle, oval, and triangle shapes). The three items may be stored in three different inventory spaces: inventory space 310A, inventory space 310B, and inventory space 310C. A single fulfillment order containing all three items may be delivered to the consumer destination 320. The origin of the fulfillment order may be from inventory space 310C.

To support the fulfillment order, the first item may be transshipped from the inventory space 310A to the inventory space 310C. Similarly, the second item may be transshipped from the inventory space 310B to the inventory space 310C. In this example, assume that the transship of the second item results in the second item arriving to the inventory space 310C at around 2:30 pm. Also assume that the delivery of the fulfillment option may use one of two delivery methods. The first delivery method results in a 3:00 pm delivery at a first cost. The second delivery method results in a 5:00 pm delivery at a second cost. The first cost may be cheaper than the second cost.

The transship of the first item from the inventory space 310A may have an effect on the performance of the network. In particular, this transship may affect which of the two delivery methods may be possible and, thus, the ultimate cost. To illustrate, assume that two transship options from the inventory space 310A are possible. The first option results in a first item arriving at the inventory space 310C around 2:30 pm and the second option at around 3:30 pm. Hence, with the first transship option (2:30 pm), both delivery methods (3:00 and 5:00 pm) are possible. Thus, the cost may be reduced by using the first delivery method at the cheaper cost. In comparison, if the second transship option (3:30 pm) is used, the only remaining possible delivery method is the second one (5:00 pm) at the higher cost. Hence, the transship from the first inventory space 310A may have a network effect. The network effect may be considered in the optimization. For instance, the first transship option may be selected such that the overall cost may be minimized.

Generally, a large number of inventory spaces distributed across a geographic region may support an electronic platform. Orders via the electronic platform for items stored in the inventory spaces may also be destined for different geographic locations.

Figure 4:
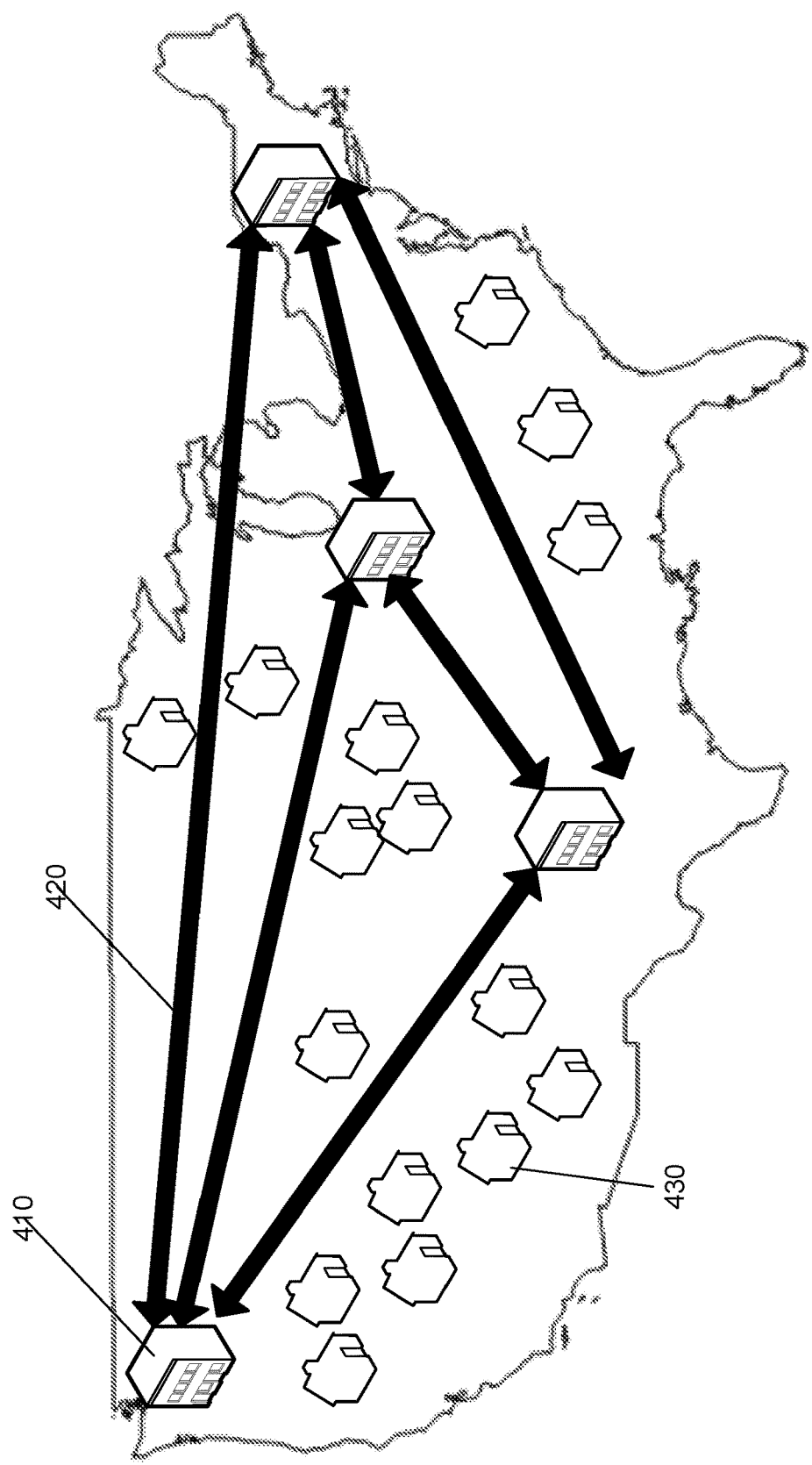
FIG. 4 illustrates example network paths within a network of inventory spaces, according to embodiments.

FIG. 4 illustrates an example of the geographic distribution. In particular, multiple inventory spaces 410 may exist in different regions. An inventory space may represent a warehouse, a fulfillment center, a storage space or any other storage building or storage facility at which items may be received, processed, stored, and/or shipped. FIG. 4 illustrates four inventory spaces, although a different number of inventory spaces may be used for an electronic platform.

A network path 420 may connect two inventory spaces. The network path 420 may represent a unidirectional or bidirectional transportation path, such as a lane or route usable to transport items between the two inventory spaces. In addition, the network path 420 may be vehicle- and/or schedule-specific. For example, two inventory spaces may be connected by two bidirectional network paths: one that uses a specific ground vehicle between specific hours and one that uses a specific aerial vehicle between specific hours. Various network vehicles may be used for a transship over a network path. Generally, a network vehicle may refer to a transportation vehicle suitable for transporting items between two or more inventory spaces.

An unconstrained network path may represent a network path for which no constraint is imposed. Generally, various constraints (e.g., time, workforce, vehicle type, weather) may limit the usability of a network path. Any of such constraints may render an unconstrained network path into a constrained network path.

Hence, as illustrated in FIG. 4, a network of inventory spaces 410 may include a number of geographically distributed inventory spaces 410. Each of the inventory spaces 410 may be correspond to a node of the network. Network paths may interconnect these nodes and may be used to transship items between the inventory spaces 410.

On the other hand, consumer demand for orders may be quantified as orders. The orders may be destined for different consumer destinations 430. These consumer destinations 430 may also be geographically distributed. A consumer destination may represent a geographic location (e.g., identified with particular coordinates or a street address) or a geographic region (e.g., a neighborhood, zip code, city) at which an order may be delivered.

The network of inventory spaces may be used to fulfill the orders. In other words, any order placed with the electronic platform may be fulfilled from any of the inventory spaces. The fulfillment may use a set of the network paths for transship prior to a delivery to a consumer destination. The network performance (e.g., overall transship and delivery cost) may be optimized such that specific inventory spaces and network paths are used to fulfill the orders.

Figure 5:
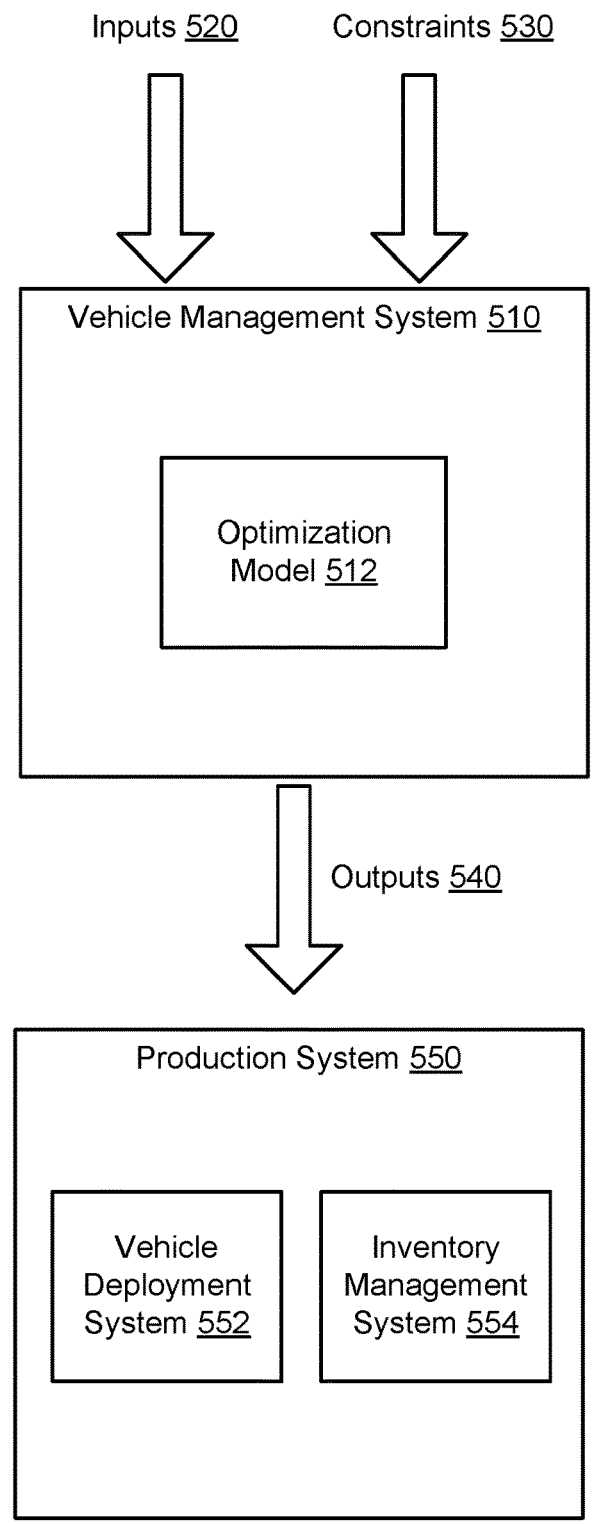
FIG. 5 illustrates an example system for managing network paths within a network of inventory spaces, according to embodiments.

Turning to FIG. 5, the figure illustrates an example vehicle management system 510 that may be implemented to manage network paths within a network of inventory spaces. Managing the network paths may include selecting a subset of the network paths and scheduling transship vehicles over the subset to transship items within the network. The selection and scheduling may rely on an optimization of a performance of the network, such as the overall transship and delivery cost of items ordered to be delivered from the inventory spaces.

The vehicle management system 510 may interface or be integrated with a production system 550 of an electronic platform. Data exchange may occur between the two systems over, for instance, an application program interface (API). Some or all of the inputs 520 and constraints 530 to the vehicle management system 510 may be received from the production system 550 over the API. Similarly, some or all of the outputs 540 of the vehicle management system 510 may be sent to the production system over the API. A feedback loop may exist from the production system 550 to the vehicle management system 510 such that the vehicle management system 510 may monitor performances of the production system 550 and may update or refine the inputs 520 and constraints 530.

Generally, the inputs 520 may relate to orders, transships, and/or deliveries. An input about an order may include, for example, information about the identifier(s) of the ordered item(s), dimensions, weights, handling instructions, delivery destination, and/or other order-related information. An input about a transship may include, for example, information about a vehicle type, a vehicle schedule, a vehicle cost, a labor cost, a transship cost, a lead time for the transship, a processing time at the source inventory space, a processing time at the destination inventory space, and/or other transship-related data. An input about a delivery may include, for example, information about a delivery method, the identifier(s) of the carrier(s), potential limits imposed by carriers (e.g., maximum number of deliveries per day), delivery time, processing and lead time, and/or other delivery-related information.

The constraints 530 may fall under multiple categories including a model category and an operation category. In particular, the vehicle management system 510 may implement one or more optimization models to generate the outputs 540. Constraints may be imposed on such models. For example, a model constraint may ensure that all ordered items should be fulfilled, each order should be fulfilled only once, units of items in an order should be fulfilled exactly according to the number of the units in the order, network capacity (e.g., transship vehicle capacity and/or delivery vehicle capacity) should not be exceeded, only acceptable fulfillment options or network paths are used, and only orders with a certain number of items should be considered (e.g., the number falling in a range between two and four, or some other range), and/or other model-related constraints. In addition, the operation and performance of the network of inventory spaces may also necessitate some operational constraints. An example of an operational constraint may include a vehicle capacity, a promised delivery date of an order, an inventory space capacity to receive and/or ship items, a labor capacity, limits on types of items that may be stored in an inventory space, and/or other operation-related constraints.

The vehicle management system may implement an optimization model 512. The optimization model 512 may process the inputs 520 and constraints 530 to generate the outputs 540. For example, the optimization model 512 may search for optimal solutions for a set of optimization parameters (e.g., transship cost and/or delivery cost) given the inputs 520 and the constraints 530. The optimization model 512 may set the outputs 540 to include the optimal solutions. Various optimization models may be available, such as one that implements a mixed-integer programming (MIP) model to represent the data and that implements an objective function to search for an optimal solution.

In an example, the vehicle management system 510 may generate an output for a next planning horizon (e.g., the next week within which orders should be fulfilled). The output may include a recommendation for network paths, vehicle types, and vehicle schedules to transship items between the inventory spaces such that the orders of the next planning horizon may be fulfilled at the lowest (or an acceptable) cost. To do so, the vehicle management system 510 may receive historical data from the production system 550. The historical data may include historical inputs and historical constraints corresponding to a previous planning horizon (e.g., the immediately past week).

For each of the historical orders from the historical data, the vehicle management system 510 may generate all possible and unconstrained fulfillment options given the network's topology (e.g., the possible and unconstrained network paths). Next, the vehicle management system 510 may perform a global optimization across the historical orders to find the optimal subset of fulfillment options for fulfilling these orders. Network paths, vehicle types, and vehicle schedules may be extracted from the optimal subset. To determine whether this optimal solution should be recommended, the vehicle management system 510 may estimate whether the optimal solution may lead to an actual performance improvement (e.g., cost savings) of the network in production (e.g., within the next planning horizon).

To do so, the vehicle management system 510 may receive production data for the next planning horizon from the production system. The production data may include actual inputs and constraints for the next planning horizon. The production data may include scheduled network paths and vehicle types. The vehicle management system 510 may estimate a baseline performance of the network from the production data, such as a simulation of the overall cost given the actual orders and the scheduled network paths and vehicle types. In addition, the vehicle management system 510 may estimate a performance of the network when the optimal solution (e.g., the network paths, vehicle types, and vehicle schedules extracted from the optimal subset of fulfillment options) is used to fulfill the actual orders. The two performances may be compared. When an improvement is detected, the vehicle management system 510 may output a recommendation to the production system 550. The recommendation may identify the network paths, vehicle types, and vehicle schedules extracted from the optimal subset of fulfillment options. Additionally or alternatively, the recommendation may identify changes over the production scheduled network paths and vehicle types.

On the other hand, the production system 550 may receive the recommendation and control particular operations of certain production subsystems accordingly. For example, a vehicle deployment system 552 of the production system 550 may alter the deployment and usage of transship vehicles based on the recommendation. In another example, an inventory management system 554 of the production system 550 may alter plans for receiving, processing, and sending items to consumer destinations and/or between inventory spaces based on the recommendation. In addition, the inventory management system 554 (or, similarly, the vehicle management system 510) may monitor recommendations over time. If a pattern of transshipping particular items to particular inventory spaces is detected, an adjustment may be made such that these items would be inventoried in these inventory spaces on a permanent basis rather than having to be transshipped thereto.

The vehicle management system 510 may further interface with other systems. Such systems may be part of the production system 550 or may be remote systems of other entities.

The interface between the vehicle management system 510 and a remote system may also be facilitated through the production system 550. For example, the vehicle deployment system 552 (and, similarly, other subsystems of the production system 550) may act as an intermediary interface between the vehicle management system 510 and the remote system. An example remote system includes a carrier management system. A carrier may operate the carrier management system to deploy transportation vehicles of the carrier. Some of these transportation vehicles may be used to transship items between the inventory spaces of the production system 550. Hence and similarly to the vehicle deployment system 552, the carrier management system may receive information about the recommendation for network paths, vehicle types, and/or vehicle schedules. In an example, the information may be received according to an electronic data interchange (EDI) protocol. The carrier management system may control operations (e.g., deployment and usage) of the carrier's transportation vehicles based on the received information.

Figure 6:
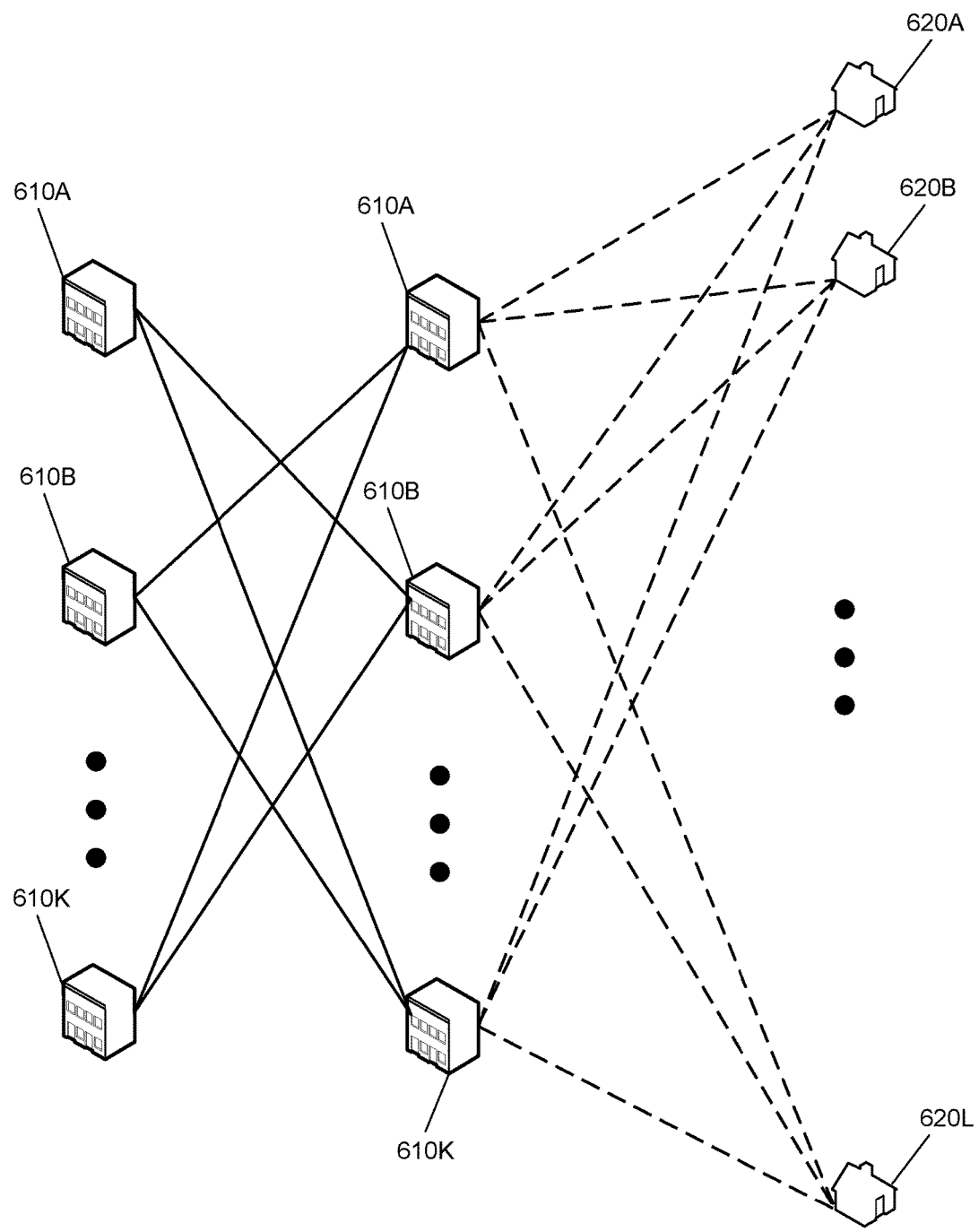
FIG. 6 illustrates an example model for managing network paths within a network of inventory spaces, according to embodiments.

As described herein, the optimal solution may represent an optimal subset of fulfillment options. The optimal subset may be derived from the set of unconstrained fulfillment options. FIG. 6 illustrates a visualization of the unconstrained fulfillment options.

As illustrated, a number "K" of inventory spaces 610A-610K may exist within a network of inventory spaces. Orders may be destined to a number "L" of consumer destinations 620A-620L. As illustrated in FIG. 6, each of the unconstrained fulfillment options may represent an unconstrained way of fulfilling an order from one or more of the inventory spaces 610A-610K. Some of these options may include transships.

Hence, the full set of unconstrained options may be visualized as the full set of network paths interconnecting the inventory spaces 610A-610K and the full set of outbound deliveries to the consumer destinations 620A-620L. In other words, for an order destined for the consumer destination 620A, the corresponding unconstrained fulfillment options include the full set of network paths and the outbound deliveries from the inventory spaces 610A-610K to the consumer destination 620A.

Once the unconstrained fulfillment options are generated, constraints may be imposed to eliminate some of these options. For example, if a transship between two inventory spaces may result in violating a promised delivery date for an order, that transship and, equivalently, the underlying network path may be removed for the order. Although removed for the order, the transship may still be applicable to another order.

By imposing the constraints, some of the unconstrained fulfillment options may be removed, resulting in a remaining set of potential fulfillment options. An optimization model may derive the optimal subset of the fulfillment options from the remaining set. The optimization may be global rather than local. For example, the overall cost of fulfilling the orders for all of the consumer destinations 620A-620L may be reduced below a targeted threshold or minimized by searching and selecting the optimal subset. In comparison, a local optimization would select the best fulfillment option per order independently of the other orders. In other words, the local optimization may reduce the cost per order regardless of the impact to the overall cost, which may in fact increase as a result of the local optimization.

Although FIG. 6 illustrates a single network path interconnecting any two inventory spaces, multiple network paths may also exist. Each of these paths may represent a lane or route between the two inventory spaces scheduled for particular hours and/or using a particular vehicle type.

Figure 7:
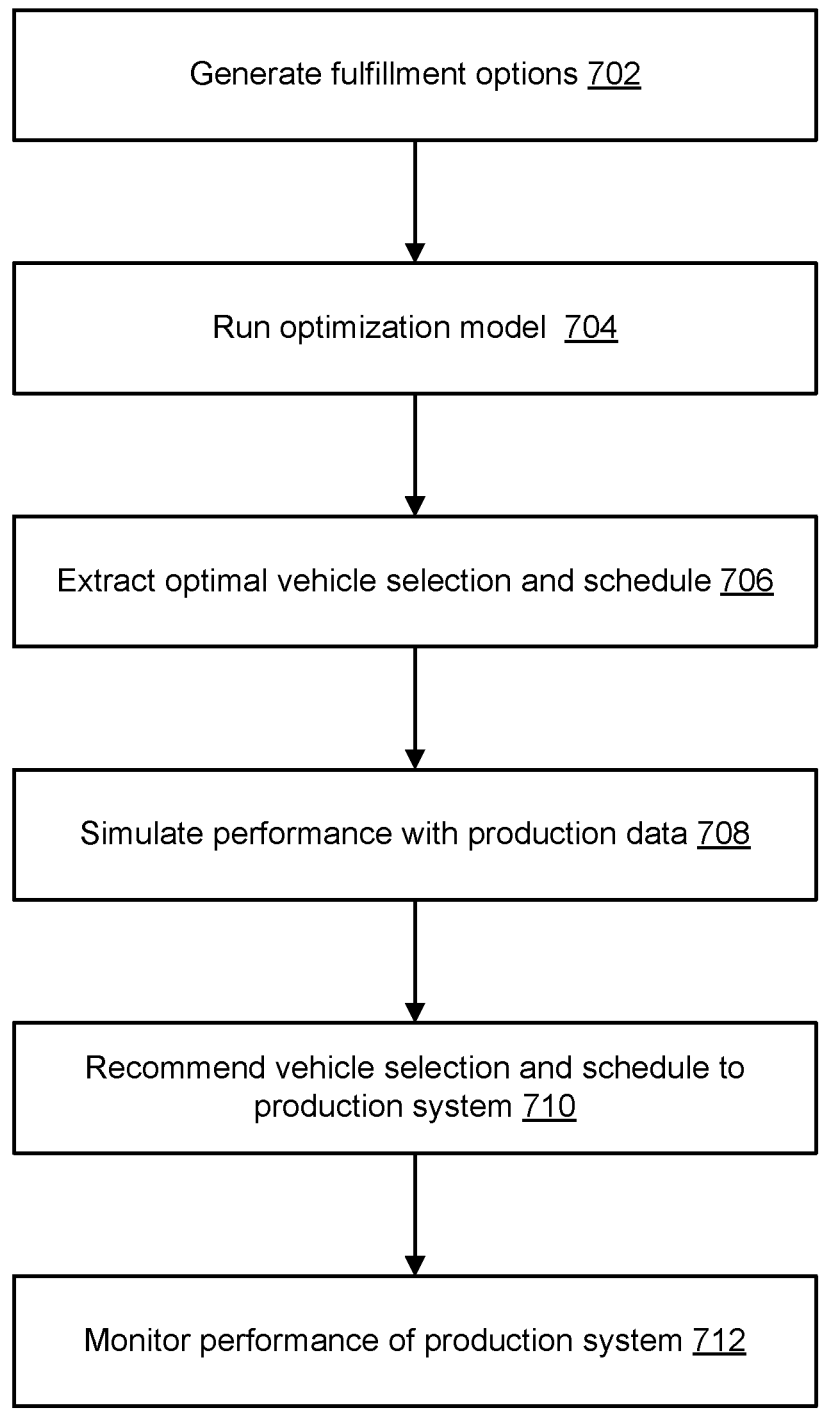
FIG. 7 illustrates an example flow for managing network paths within a network of inventory spaces, according to embodiments.
Figure 8:
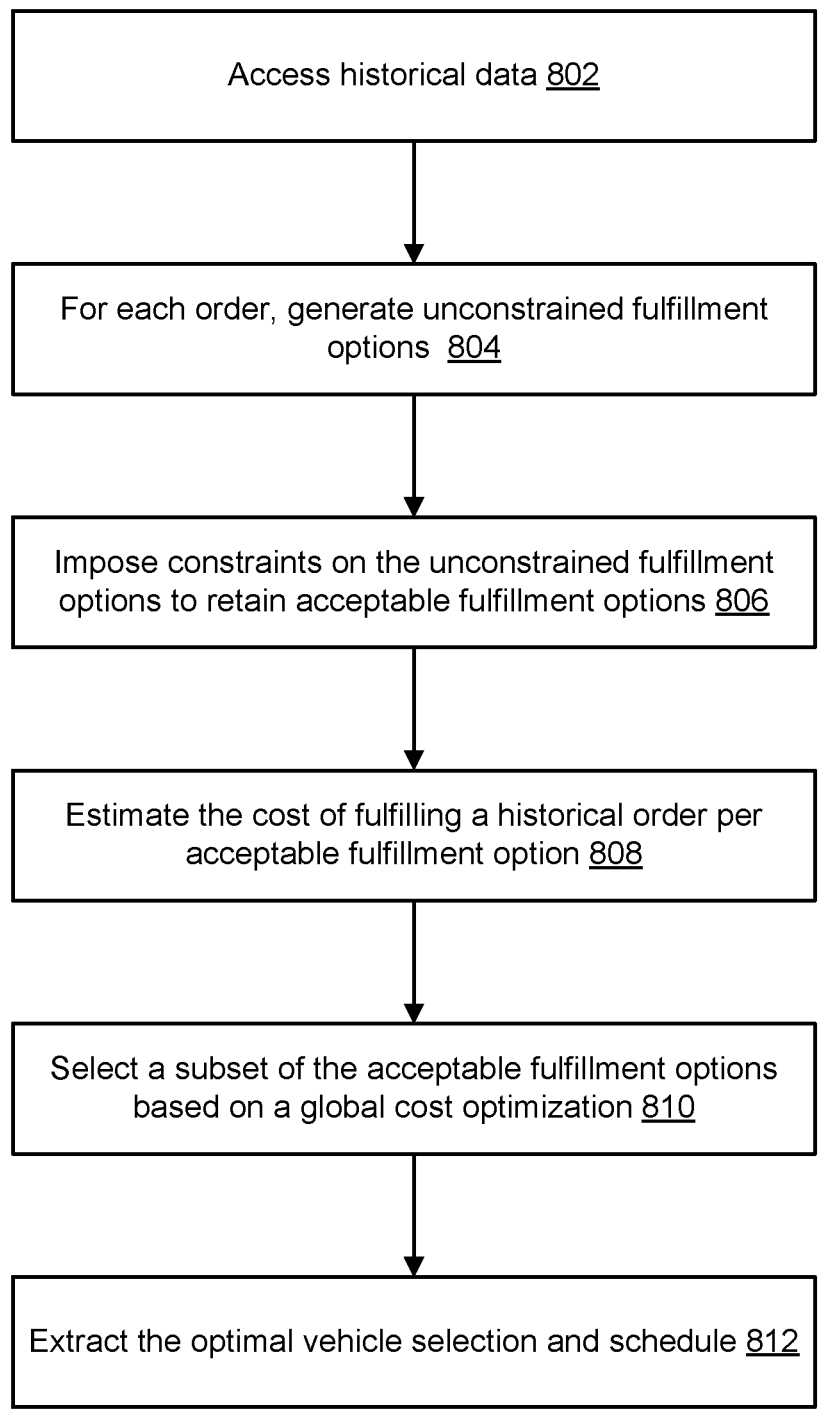
FIG. 8 illustrates an example flow for extracting vehicle selection and a schedule as part of managing network paths within a network of inventory spaces, according to embodiments.
Figure 9:
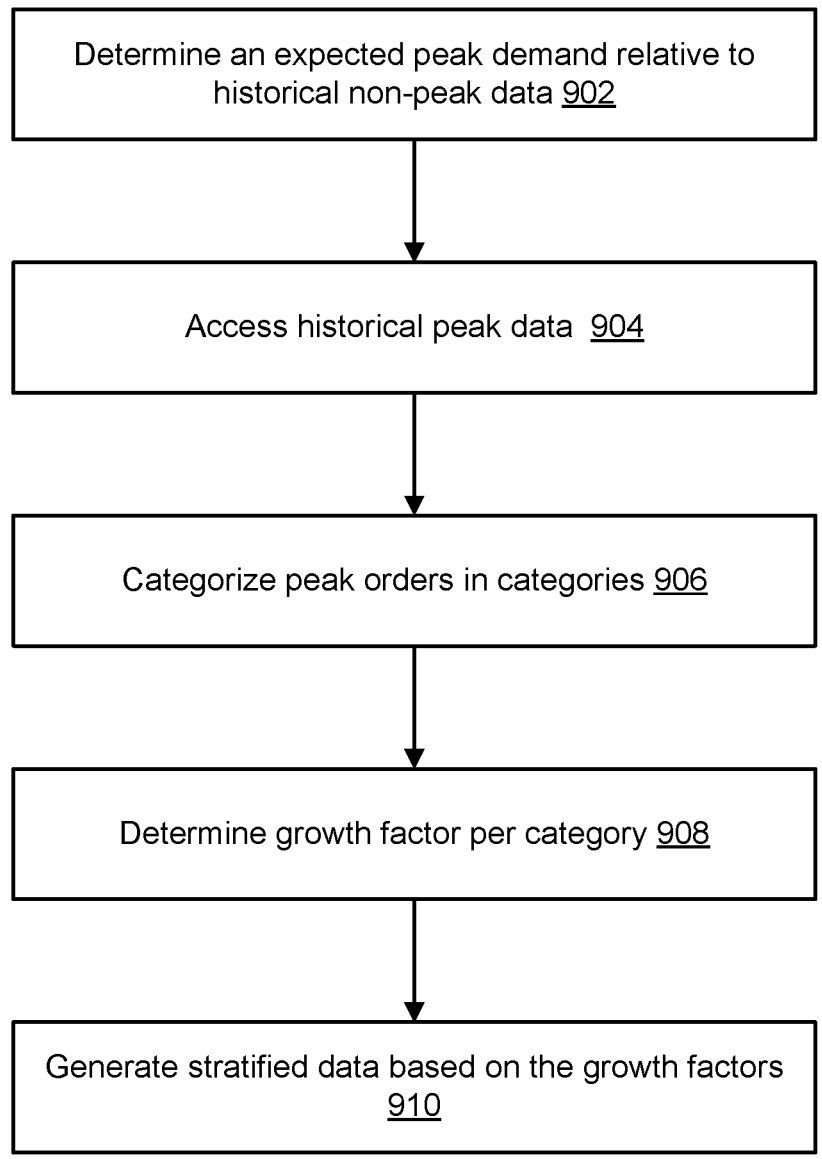
FIG. 9 illustrates an example flow for managing network paths within a network of inventory spaces to support peak demand, according to embodiments.

Turning to FIGS. 7-9, the figures illustrate example flows for affecting a performance of a network of inventory spaces by selecting and scheduling transships over network paths of the network. In particular, FIG. 7 illustrates an example flow for managing the network paths based on selecting optimal fulfillment options. In comparison, FIG. 8 illustrates an example flow for extracting vehicle selection and scheduling as part of managing the network paths. FIG. 9 illustrates an example flow for managing the network paths to support periods of peak consumer demand for items. Some operations across the example flows may be similar. Such similarities are not repeated herein in the interest of clarity of explanation.

In the illustrative operations, some of the operations or functions may be embodied in, and fully or partially automated by, components executed by one or more processors. For example, a vehicle management system, such as the vehicle management system 510 of FIG. 5, may be configured to perform some of the operations. In addition, while the operations are illustrated in a particular order, it should be understood that no particular order is necessary and that one or more operations may be omitted, skipped, and/or reordered.

Turning to FIG. 7, the example flow may start at operation 702, where fulfillment options may be generated. For example, the vehicle management system may receive historical production data for a past planning horizon from a production system. For each historical order, the vehicle management system may generate unconstrained fulfillment options to fulfill the historical order.

At operation 704, an optimization model may be run to find the optimal fulfillment options for fulfilling the orders. For example, the vehicle management system may implement and run the optimization model, such as an MIP model that uses an objective function. An objective function is further described in connection with FIG. 8. The optimization model may perform a global optimization such that the overall network performance is optimized (e.g., the transship and/or delivery costs are reduced below a targeted threshold or minimized). In an example, certain model and operation constraints may be imposed. These constraints may remove some of the unconstrained fulfillment options, thereby reducing the complexity of searching for the optimal solution. Additional techniques may also be implemented to reduce the complexity, such as subsampling, iterative batching, and/or heuristics.

At operation 706, an optimal vehicle selection and vehicle schedule may be extracted from the optimal fulfillment options. For example, each of the fulfillment options may identify a network path scheduled with a particular vehicle type. Accordingly, the vehicle management system may select and set the network paths, vehicle types, and vehicle schedules as the optimal vehicle selection and schedule.

At operation 708, a performance of the network may be simulated with production data. For example, the vehicle management system may receive the production data including actual orders, constraints, and scheduled vehicles for the next planning horizon. The vehicle management system may estimate a baseline performance of the network by, for example, using a Montecarlo simulation to simulate the overall transship and delivery cost to fulfill the production orders. In addition, the management system may use a Montecarlo simulation to estimate the performance (e.g., the overall transship and delivery cost) if the extracted, optimal network paths, vehicle types, and vehicle schedules were used instead to fulfill the production orders.

At operation 710, a recommendation may be generated and provided to the production system. For example, the vehicle management system may compare the two performances. If an improvement over the baseline is detected, the vehicle management system may recommend the use of the extracted, optimal network paths, vehicle types, and vehicle schedules. Otherwise, the vehicle management system may recommend the use or no change to the production plan.

At operation 712, the actual performance of the production system during the next planning horizon may be monitored. For example, the vehicle management system may periodically pull or automatically receive at time intervals production data that relates to a recommended network path. That production data may include actual transship and delivery cost for the network path. The vehicle management system may compare such a cost to a simulated cost for the network path. The comparison may allow a determination of actual credit (e.g., savings or losses) that each recommended network path should get relative to the overall performance of the network. In addition, by comparing the overall production performance to a simulated performance, discrepancies may be identified and analyzed to determine the respective root causes. Some root causes may not be controllable (e.g., a weather storm, a labor shortage). Other root causes may relate to the inputs and constraints of the optimization model and may, thus, be used to further refine the optimization model in a way that may reduce the discrepancies.

Some or all of the operations of FIG. 7 may be performed on a continuous basis or at short time intervals such that the outputted recommendation and the measured performance represent the most up-to-date and substantially real-time data. A short time interval may be defined as a fraction of the planning horizon. For example, if the planning horizon covers a week, the short planning horizon may represent a day or a work shift within a day. As such, the most up-to-date production data may be used to generate and/or update the recommendation and the performance. If, within the planning horizon, customer demand and/or the item inventory data change (e.g., orders are cancelled, items become available in an inventory space, or other changes), the continuous and/or short time interval updates may account for such changes.

FIG. 8 illustrates a more detailed flow for finding the optimal solution and extracting the vehicle selection and vehicle schedule. The example flow of FIG. 8 may start at operation 802, where historical data may be accessed. The historical data may be associated with a past planning horizon and may include historical data that relates to orders, transships, and/or deliveries and historical data that relates to constraints of the network of inventory spaces. Historical order data may include, for example, information about the identifier(s) of the ordered item(s), dimensions, weights, handling instructions, and/or delivery destinations. Historical transship data may include, for example, information about vehicle types, vehicle schedules, vehicle costs, labor costs, transship costs, lead times for transships, processing times at source inventory spaces, and/or processing times at destination inventory spaces. Historical delivery data may include, for example, information about delivery methods, identifiers of the carriers, potential limits imposed by carriers, delivery times, and/or processing and lead times. Historical constraint data may include information about operational constraints, such as vehicle capacity, promised delivery dates of orders, inventory space capacities, labor capacities, and/or limits on types of items that may be stored in an inventory space.

At operation 804, unconstrained fulfillment options may be generated for each order. For example, the vehicle management system may generate all possible network paths, vehicle types, and vehicle schedules to fulfill each of the historical orders based on a stored topology of the network of inventory spaces and based on the consumer destinations for the historical orders.

At operation 806, constraints may be imposed on the unconstrained fulfillment options to retain acceptable fulfillment options and, equivalently, eliminate unacceptable fulfillment options. For example, the vehicle management system may determine whether an unconstrained fulfillment option violates one or more of the above historical constraints. If so, the unconstrained fulfillment option may be removed. Similarly, the vehicle management system may impose one or more model constraints. A model constraint may necessitate that all ordered items should be fulfilled, each order should be fulfilled only once, units of the items in an order should be fulfilled exactly according to the number of the units in the order, network capacity (e.g., transship vehicle capacity and/or delivery vehicle capacity) should not be exceeded, only acceptable fulfillment options or network paths are used, and/or only orders with a certain number of items should be considered (e.g., the number falling in a range between two and four, or some other range). Any fulfillment option that violates a model constraint may be removed.

At operation 808, a cost of fulfilling a historical order per acceptable fulfillment option may be determined. The cost may represent an example of a performance metric of the network. For example, for each of the historical orders, there may be multiple acceptable fulfillment options. Hence, the vehicle management system may estimate for each of the historical orders the cost per acceptable fulfillment option. A cost may include, for example, a transship cost and/or a delivery cost per fulfillment option and per historical order. In an example, for a historical order "o," a network path "a" using a particular vehicle type "s" and a vehicle schedule "t," the individual cost may be expressed in part as: $(l_{a_s}+c_s)x_{ost}+c_a y_{at}$. "$l_a$" may represent the cost of network path "a" and may include processing costs at both source and destination inventory spaces. "$c_s$" may represent shipping cost of the vehicle type "s." "$x_{ost}$" may be a variable of "0" or "1" to indicate if order "o" would use the vehicle type "s" and vehicle schedule "t" (e.g., departure time of a vehicle). "$c_a$" may represent a transship vehicle cost on the network path "a." "$y_{at}$" may be a variable of "0" or "1" to indicate if a transship vehicle is scheduled for network path "a" at time "t."

At operation 810, a subset of the acceptable fulfillment options may be selected based on a global cost optimization. For example, the vehicle management system may implement an optimization model, such as an MIP, to search for the optimal overall cost. The overall cost may be the total cost for fulfilling the historical orders. Once the optimization is complete, there may be one fulfillment option per historical order. The collection of such remaining fulfillment options may represent the subset of optimal fulfillment options. In an example, the optimization model may use an objective function to estimate the lowest overall cost. The fulfillment options that may result in the lowest overall cost may be the subset of optimal fulfillment options. The objective function may be expressed in part as: $\min \Sigma_{ost}(l_{a_s}+c_s)x_{ost}+\Sigma_{at}c_a y_{at}$. The above model constraints may be imposed. These constraints may be expressed as:

$$\Sigma_{s \in S_o}x_{ost}n_{si}=n_{oi}, \forall o, i \in I_i$$

$$\Sigma_{o,s \in S_o}x_{ost}[a_s=a] \le Hy_{at}, \forall a,t;$$

$$x_{ost}[a_s=a] \le y_{at}, \forall o, s \in S_o, a, t;$$

$$x_{ost}[a_s=a]=0, \forall o, s \in S_o, a, t < R_o+T_{source}^a;$$

$$x_{ost}[a_s=a]=0, \forall o, s \in S_o, a, t > P_o-T_a-T_{destination}^a; \text{ and}$$

$$x_{ost} \in \{0,1\}, y \in \{0,1\}, \text{ where}$$

"$a \in A$" may represent an index set for network paths, "$o \in O$" an index set for orders, "$s \in S_o$" a vehicle type for order "o,"

"i∈I_o" items in order "o," "a_s" network path used by vehicle type "s" if present, "n_{oi}" number of units of item "i" in the order "o," "n_{si}" number of units of item "i" in the vehicle type "s" for the order "o," "T_a" transship lead time on network path "a," "T_{source}^a" processing time at source inventory space of network path "a," "T_{destination}^a" processing time at destination inventory space of network path "a," "H" truck capacity, "P_o" promise shipping time of order "o," and "R_o" first planning time of order "o."

At operation 812, the optimal vehicle selection and vehicle schedule may be extracted. For example, the vehicle management system may determine the variables $x_{ost}$ and $y_{at}$ per order responsible for the lowest overall cost. For each of the orders, the network path "a," vehicle type "s," and vehicle schedule "t" may represent the optimal vehicle selection and vehicle schedule.

The optimal vehicle selection and vehicle schedule for the next planning horizon may be based on a global optimization that uses historical data, such as historical orders and constraints, associated with a past planning horizon. In certain situations, the change between the historical data and the current data of the next planning horizon may be large (e.g., exceeds a predefined threshold). For instance, the next planning horizon may fall within a peak consumer demand season associated with a spike in the number of orders. In such situations, using the historical data may result in a sub-optimal vehicle selection and vehicle schedule. To improve the optimality, the historical data may be stratified and the stratified data may be used to search for the optimal vehicle selection and vehicle schedule. The stratification may include determining scaling factors based on past peak consumer demand seasons, categorizing orders, determining patterns of categorized orders, and accordingly applying the growth factors to the order categories.

FIG. 9 illustrates an example flow for stratifying data such that the stratified data may be used as inputs to an optimization model of the vehicle management system. In this example flow, historical data for a past planning horizon (e.g., the immediate past week) may be referred to as historical non-peak data and may include information about historical non-peak orders. Historical data for a past peak season may be referred to as historical peak data and may include information about historical peak orders. Both data types may be used to generate the stratified data.

The example flow may start at operation 902, where an expected peak demand may be determined relative to the historical non-peak data. For instance, there may be certain time periods within a year where peak consumer demand may be expected. These time periods may fall within the last two months in the year. In an example, the vehicle management system may identify the expected peak demand based on the next planning horizon falling within these time periods. Further, the vehicle management system may validate that the peak demand is expected by comparing the amount of orders from the historical peak data of these time periods to the amount of orders from the historical non-peak data. If the difference indicates a change that exceeds a threshold, the expectation of a peak demand may be validated.

At operation 904, the historical peak demand data may be accessed. For example, the vehicle management system may request and receive this data from the production system.

At operation 906, the peak orders may be categorized. In an example, the vehicle management system may categorize the peak orders in different categories given a set of categorization parameters. The categorization parameters may include, for instance, order day, order hour, consumer location, number of items within an order, and/or delivery methods.

At operation 908, a growth factor may be determined per category of orders. In an example, for a category, the vehicle management system may consider the historical peak orders over a number of years and apply a regression to this data to determine the growth factor. In addition, the vehicle management system may determine an overall growth factor by applying a linear regression to the uncategorized peak orders over the number of years.

At operation 910, stratified data may be generated based on the growth factors. In an example, stratified data may be generated per category of orders by applying the respective growth factor. In another example, stratified data may be generated across all categories by applying the overall growth factor. In yet another example, the individual growth factors and the overall growth factors may be used. For instance, if the difference between the growth factor for a category and the overall growth factor exceeds a threshold, the individual growth factor of that category may be applied. Otherwise, the overall growth factor may be applied. This mixed application of growth factors may be generalized such that, over time, the overall growth factor may be used for certain categories without a computation of the individual growth factor.

In an example, the vehicle management system applies the growth factors (whether individual or overall) to respective peak orders from the last year to generate a strata forecast.

The strata forecast may be used to sample the historical non-peak data, resulting in stratified data. To do so, assume N strata and denote by "s_i" the number of orders in stratum "i=1 . . . N." Assume that the growth factors have been applied to "s_i." In addition, suppose a sample of "p %" to be generated as the stratified data. As such, $$"p \% \times \sum_{i=1}^{N} s_i"$$

sample order should be generated. "t_i=p %×s_i" may be sampled from stratum "i." However, "t_i" may not be an integer. Rounding "t_i" up, down, or to the closest integer may result in an over or under sampling when there is a large number of strata. To deal with that issue, the following modification may be applied to "t_i". Let "t_i=u_i+d_i," where "u_i" may be the integral part of "t_i" and "d_i" may be the decimal part. In particular, "d_i∈[0,1]." Let "x_i" be a random variable with a Bernoulli distribution such that $$x_i = \begin{cases} 1 \text{ with probability } d_i \\ 0 \text{ with probability } 1-d_i \end{cases}.$$

The stratified data may then be generated by taking "u_i+x_i" orders for stratum "i."

Figure 10:
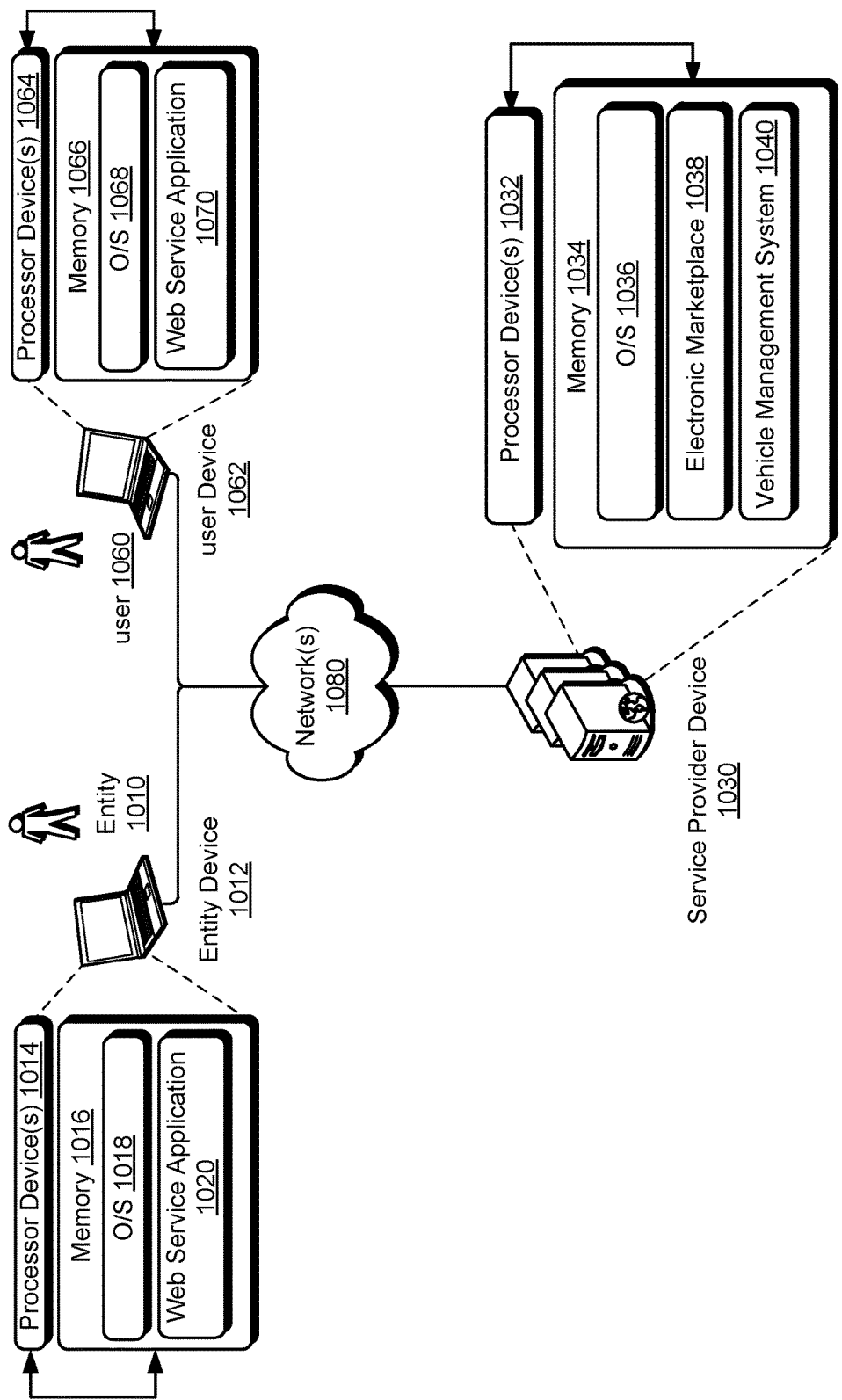
FIG. 10 illustrates an example architecture for providing a web-based resource, including at least one user device and/or one or more service provider devices connected via one or more networks, according to embodiments.

Turning to FIG. 10, that figure illustrates an example end-to-end computing environment for managing network paths. In this example, a service provider may implement an electronic platform within the context of, for example, an electronic marketplace available to users (e.g., consumers) and entities (e.g., merchants).

In a basic configuration, an entity 1010 may utilize an entity device 1012 to access local applications, a web service application 1020, an entity account accessible through the web service application 1020, a web site or any other network-based resources via one or more networks 1080. In some aspects, the web service application 1020, the web site, and/or the entity account may be hosted, managed, and/or otherwise provided by one or more computing resources of the service provider, such as by utilizing one or more service provider devices 1030. The entity 1010 may use the local applications and/or the web service application 1020 to interact with the network-based resources of the service provider and perform entity-related transactions. These transactions may include, for example, offering items for sale.

In some examples, the entity device 1012 may be any type of computing devices such as, but not limited to, a mobile phone, a smart phone, a personal digital assistant (PDA), a laptop computer, a thin-client device, a tablet PC, etc. In one illustrative configuration, the entity device 1012 may contain communications connection(s) that allow the entity device 1012 to communicate with a stored database, another computing device or server, entity terminals, and/or other devices on the networks 1080. The entity device 1012 may also include input/output (I/O) device(s) and/or ports, such as for enabling a connection with a keyboard, a mouse, a pen, a voice input device, a touch input device, a display, speakers, a printer, etc.

The entity device 1012 may also include at least one or more processing units (or processor device(s)) 1014 and one memory 1016. The processor device(s) 1014 may be implemented as appropriate in hardware, computer-executable instructions, firmware, or combinations thereof. Computer-executable instructions or firmware implementations of the processor device(s) 1014 may include computer-executable or machine-executable instructions written in any suitable programming language to perform the various functions described.

The memory 1016 may store program instructions that are loadable and executable on the processor device(s) 1014, as well as data generated during the execution of these programs. Depending on the configuration and type of entity device 1012, the memory 1016 may be volatile (such as random access memory (RAM)) and/or non-volatile (such as read-only memory (ROM), flash memory, etc.). The entity device 1012 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1016 may include multiple different types of memory, such as static random access memory (SRAM), dynamic random access memory (DRAM), or ROM.

Turning to the contents of the memory 1016 in more detail, the memory may include an operating system (O/S) 1018 and the one or more application programs or services for implementing the features disclosed herein including the web service application 1020. In some examples, the entity device 1012 may be in communication with the service provider devices 1030 via the networks 1080, or via other network connections. The networks 1080 may include any one or a combination of many different types of networks, such as cable networks, the Internet, wireless networks, cellular networks, and other private and/or public networks. While the illustrated example represents the entity 1010 accessing the web service application 1020 over the networks 1080, the described techniques may equally apply in instances where the entity 1010 interacts with the service provider devices 1030 via the entity device 1012 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a user 1060 may utilize user device 1062 to access local applications, a web service application 1070, a user account accessible through the web service application 1070, a web site, or any other network-based resources via the networks 1080. In some aspects, the web service application 1070, the web site, and/or the user account may be hosted, managed, and/or otherwise provided by the service provider devices 1030 and may be similar to the web service application 1020, the web site accessed by the computing device 1012, and/or the entity account, respectively.

The user 1060 may use the local applications and/or the web service application 1070 to conduct transactions with the network-based resources of the service provider. These transactions may include, for example, searching for items offered by the entity 1010 at the network-based resources, receiving offers for the items, ordering items, and other transactions.

In some examples, the user device 1062 may be configured similarly to the entity device 1012 and may include at least one or more processing units (or processor device(s)) 1064 and one memory 1066. The processor device(s) 1064 may be implemented as appropriate in hardware, computer-executable instructions, firmware, or combinations thereof similarly to the processor device(s) 1014. Likewise, the memory 1066 may also be configured similarly to the memory 1016 and may store program instructions that are loadable and executable on the processor device(s) 1064, as well as data generated during the execution of these programs. For example, the memory 1066 may include an operating system (O/S) 1068 and the one or more application programs or services for implementing the features disclosed herein including the web service application 1070.

As described briefly above, the web service applications 1020 and 1070 may allow the entity 1010 and user 1060, respectively, to interact with the service provider devices 1030 to conduct transactions involving items. The service provider devices 1030, perhaps arranged in a cluster of servers or as a server farm, may host the web service applications 1020 and 1070. These servers may be configured to host a web site (or combination of web sites) viewable via the computing devices 1012 and 1062. Other server architectures may also be used to host the web service applications 1020 and 1070. The web service applications 1020 and 1070 may be capable of handling requests from many entities 1010 and users 1060, respectively, and serving, in response, various interfaces that may be rendered at the computing devices 1012 and 1062 such as, but not limited to, a web site. The web service applications 1020 and 1070 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1020 and 1070, such as with other applications running on the computing devices 1012 and 1062, respectively.

The service provider devices 1030 may, in some examples, provide network-based resources such as, but not limited to, applications for purchase and/or download, web sites, web hosting, client entities, data storage, data access, management, virtualization, etc. The service provider devices 1030 may also be operable to provide web hosting, computer application development, and/or implementation platforms, or combinations of the foregoing to the entity 1010 and user 1060.

The service provider devices 1030 may be any type of computing device such as, but not limited to, a mobile phone, a smart phone, a personal digital assistant (PDA), a laptop computer, a desktop computer, a server computer, a thin-client device, a tablet PC, etc. The service provider devices 1030 may also contain communications connection(s) that allow service provider devices 1030 to communicate with a stored database, other computing devices or servers, entity terminals, and/or other devices on the network 1080. The service provider devices 1030 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 1030 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1030 may be in communication with the computing devices 1012 and 1062 via the networks 1080, or via other network connections. The service provider devices 1030 may include one or more servers, perhaps arranged in a cluster, or as individual servers not associated with one another.

In one illustrative configuration, the service provider devices 1030 may include at least one or more processing units (or processor devices(s)) 1032 and one memory 1034. The processor device(s) 1032 may be implemented as appropriate in hardware, computer-executable instructions, firmware, or combinations thereof. Computer-executable instruction or firmware implementations of the processor device(s) 1032 may include computer-executable or machine-executable instructions written in any suitable programming language to perform the various functions described.

The memory 1034 may store program instructions that are loadable and executable on the processor device(s) 1032, as well as data generated during the execution of these programs. Depending on the configuration and type of the service provider devices 1030, the memory 1034 may be volatile (such as random access memory (RAM)) and/or non-volatile (such as read-only memory (ROM), flash memory, etc.). The service provider devices 1030 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1034 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1034 in more detail, the memory may include an operating system (O/S) 1036, code for an electronic marketplace 1038 and code for a vehicle management system 1040. The code for the electronic marketplace 1038 may support different front end and back functionalities of the electronic marketplace. The code for the vehicle management system 1040 may support the different network path management functionalities as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system comprising:
    a production system; and
    a vehicle management system communicatively coupled with the production system over a data interface and comprising:
        a processor; and
        a memory comprising instructions that, when executed by the processor, cause the vehicle management system to at least:
            receive, from the production system over the data interface, data about consumer demand for items available based at least in part on a network connecting storage buildings via transportation paths and transportation vehicles usable to transport the items between the storage buildings;
            access historical data associated with the consumer demand;
            generate unconstrained fulfillment options to fulfill the consumer demand based at least in part on the historical data and the network, a fulfillment option comprising a type and a schedule of a transportation vehicle to transport an item from a first storage building to a second storage building based at least in part on a transportation path, the consumer demand to be fulfilled by the production system based at least in part on the item being transported to the second storage building;
            evaluate a performance of the network associated with utilizing a subset of the fulfillment options to fulfill the consumer demand, the subset of the fulfillment options comprising the fulfillment option and utilizing a subset of the transportation paths and transportation vehicles, the performance evaluated based at least in part on constraints associated with the network and variables associated with the subset of the transportation paths and transportation vehicles;
            select the subset of the fulfillment options to fulfill the consumer demand based at least in part on a comparison of the performance to a second performance of the network indicating an improvement to a utilization of the network, the second performance associated with utilizing a second subset of the fulfillment options to fulfill the consumer demand by the production system, the second performance determined based at least in part on production data that is received from the production system over the data interface and that comprises scheduled network paths and transportation vehicles; and
            send, to the production system over the data interface, a recommendation that identifies the subset of the fulfillment options, wherein the production system a deployment system based at least in part on the recommendation by at least changing the scheduled network paths and transportation vehicles and causing the deployment system to deploy the transportation vehicle to transport the item from the first storage building to the second storage building according to the schedule.

2. The computing system of claim 1, wherein the performance of the network comprises an outbound cost from the network, and wherein evaluating the performance comprises inputting data about the fulfillment options to a mixed-integer programming model and searching for, based at least in part on an objective function, a particular subset of the fulfillment options that reduces the outbound cost given the constraints and the variables.

3. The computing system of claim 1, wherein the instructions, when executed by the processor further cause the system to at least:
    access current data associated with the consumer demand over a current planning horizon;
    simulate the performance of the network based at least in part on the current data and a utilization of transportation vehicles according to the subset of the fulfillment options;
    determine a current performance of the network based at least in part on the current data and a utilization of the transportation vehicles according to a current utilization schedule over the current planning horizon;
    determine a performance improvement based at least in part on a comparison of the simulated performance to the current performance;
    generate the recommendation based at least in part on the performance improvement, the recommendation comprising scheduling the utilization of the transportation vehicle according to the subset of the fulfillment options; and
    monitor the performance improvement during the current planning horizon to determine an actual performance improvement based at least in part on the utilization of the transportation vehicle according to the subset of the fulfillment options.

4. The computing system of claim 1, wherein the performance comprises at least one of: an outbound cost or an outbound throughput of the network during a planning horizon, wherein the variables comprise at least one of: labor costs associated the storage buildings, transportation costs associated with transportation vehicles, or vehicle costs associated with the transportation vehicles, and wherein the constraints comprise at least one of: a condition to satisfy the consumer demand in full during the planning horizon or a capacity constraint of the transportation vehicles.

5. A computer-implemented method, comprising:
    receiving, from a production system over a data interface, data about consumer demand for items available based at least in part on a network connecting inventory spaces via network paths and network vehicles;
    generating unconstrained fulfillment options to fulfill the consumer demand, the fulfillment options comprising types and schedules of the network vehicles to transport a portion of the items between the inventory spaces based at least in part on the network paths;

selecting a subset of the fulfillment options based at least in part on a comparison of a performance of the network to another performance of the network associated with another subset of the fulfillment options, the comparison indicating an improvement to a utilization of the network, the performance associated with utilizing the subset of the fulfillment options to fulfill the consumer demand, the performance evaluated based at least in part on constraints associated with the network of inventory spaces and variables associated with utilizing the network paths between the inventory spaces, the other performance determined based at least in part on production data that is received from the production system over the data interface and that comprises scheduled network paths and network vehicles; and sending, to the production system over the data interface, a recommendation that identifies the subset of the fulfillment options, wherein the production system controls a deployment system based at least in part on the recommendation by at least changing the scheduled network paths and network vehicles and causing the deployment system to deploy the network vehicles according to the schedules.

6. The computer-implemented method of claim 5, wherein the network vehicles are scheduled for a current planning horizon, wherein the fulfillment options are generated based at least in part on historical data associated with the consumer demand observed during an immediately previous planning horizon.

7. The computer-implemented method of claim 6, wherein the network vehicles are scheduled for the current planning horizon based at least in part on current data associated with the consumer demand during the current planning horizon and based at least in part on the subset of the fulfillment options.

8. The computer-implemented method of claim 5, wherein the unconstrained fulfillment options are based at least in part on the network paths interconnecting all of the inventory spaces and unconstrained capacity associated with the network vehicles utilizing the network paths.

9. The computer-implemented method of claim 5, wherein the subset of the fulfillment options comprises a topology of the network paths, particular types of the network vehicles, and particular schedules of the network vehicles, wherein the topology indicates a subset of the network paths selected for transporting the portion of the items, and wherein the particular types and the particular schedules indicate a plan to utilize the network vehicles to transport the portion of the items based at least in part on the topology.

10. The computer-implemented method of claim 5, wherein the performance of the network comprises outbound costs associated with fulfilling the consumer demand, wherein the variables comprise intra-network costs associated with transporting the portion of the items, wherein the constraints comprise vehicle capacity constraints and consumer demand constraints, and wherein the performance of the network is evaluated based at least in part on an optimization model that reduces the outbound costs given the intra-network costs, the vehicle capacity constraints, and the consumer demand constraints.

11. The computer-implemented method of claim 10, wherein the optimization model implements a mixed-integer programming model and an objective function to output a topology of the network paths, particular types of the network vehicles, and particular schedules of the network vehicles.

12. The computer-implemented method of claim 10, wherein the consumer demand comprises consumer orders for the items, wherein the intra-network costs, the vehicle capacity constraints, and the consumer demand constraints are based at least in part on historical data of the consumer demand, and wherein the historical data is subsampled based at least in part on a range of a number of items per consumer order.

13. The computer-implemented method of claim 5, wherein the subset of fulfillment options comprises a recommended plan to utilize the network vehicles, and further comprising:

accessing current data associated with the consumer demand over a current planning horizon;

simulating the performance of the network based at least in part on the current data and the recommended plan;

simulating a current performance of the network based at least in part on the current data and a current plan to utilize the network vehicles;

determining a performance improvement based at least in part on a comparison of the performance and the current performance; and providing the recommended plan to the deployment system based at least in part on the performance improvement.

14. The computer-implemented method of claim 13, further comprising sending the recommended plan to a remote carrier management system of a carrier, and wherein providing the recommended plan comprises identifying a subset of the network paths, respective types of the network vehicles to utilize over the subset of the network paths, and respective schedules to transport the portion of the items between the inventory spaces.

15. A non-transitory computer-readable medium comprising instructions that, when executed on a computing system, cause the computing system to at least:

receive, from a production system over a data interface, data about consumer demand for items available based at least in part on a network connecting inventory spaces via network paths and network vehicles;

access historical data about the consumer demand;

generate, based at least in part on the historical data, unconstrained fulfillment options to fulfill the consumer demand, the fulfillment options comprising types and schedules of the network vehicles to transport a portion of the items between the inventory spaces based at least in part on the network paths;

select a subset of the fulfillment options to fulfill the consumer demand based at least in part on a comparison of a performance evaluation of the network to a second performance evaluation of the network, the comparison indicating an improvement to a utilization of the network, the performance evaluation subjecting different subsets of the fulfillment options to constraints associated with the network of inventory spaces and variables associated with utilizing the network paths, the second performance evaluation determined based at least in part on production data that is received from the production system over the data interface and that comprises scheduled network paths and network vehicles; and send, to the production system over the data interface, a recommendation that identifies the subset of the fulfillment options, wherein the production system controls a deployment system based at least in part on the recommendation by at least changing the scheduled network path and network vehicles and causing the deployment system to deploy the network vehicles according to the schedules.

16. The non-transitory computer-readable medium of claim 15, wherein the network vehicles are scheduled for a current planning horizon, wherein the historical data is associated with the consumer demand observed during a previous planning horizon, and wherein the instructions when executed on the computing system further cause the computing system to at least:
  detect that a change between the historical data and current data associated with consumer demand during the current planning horizon exceeds a threshold;
  stratify the historical data based at least in part on the change; and
  generate the fulfillment options based at least in part on the stratified data.

17. The non-transitory computer-readable medium of claim 16, wherein stratifying the historical data comprises:
  accessing second historical data associated with the consumer demand based at least in part on a change between the second historical data and the current data falling below the threshold;
  categorizing the consumer demand in categories;
  determining growth factors corresponding to the categories based at least in part on the second historical data; and
  stratifying the historical data based at least in part on the growth factors.

18. The non-transitory computer-readable medium of claim 15, wherein the subset of fulfillment options comprises a subset of the network paths, respective types of the network vehicles to utilize over the subset of the network paths, and respective schedules to transport the portion of the items between the inventory spaces.

19. The non-transitory computer-readable medium of claim 15, wherein the subset of fulfillment options comprise a recommended utilization of the network paths and the network vehicles over a planning horizon, and wherein the instructions when executed on the computing system further cause the computing system to at least monitor a current utilization of the network path and the network vehicles during the planning horizon.

20. The non-transitory computer-readable medium of claim 19, wherein the instructions when executed on the computing system further cause the computing system to at least:
  determine a change between the recommended utilization and the current utilization of the network paths and the network vehicles; and
  update the constraints and the variables based at least in part on the change.

* * * * *